United States Patent [19]
Yeh

[11] Patent Number: 5,524,528
[45] Date of Patent: Jun. 11, 1996

[54] ELECTRIC GRILLER

[75] Inventor: Yun-Pin Yeh, Taipei Hsien, Taiwan

[73] Assignee: Quality & Strength Inc., Taiwan

[21] Appl. No.: 518,669

[22] Filed: Aug. 24, 1995

[51] Int. Cl.⁶ .................................................. A47J 37/06
[52] U.S. Cl. .............................. 99/446; 99/400; 219/443
[58] Field of Search ............................ 99/375, 400, 425, 99/444–446, 450; 219/443, 455

[56] References Cited

U.S. PATENT DOCUMENTS 5,355,779   10/1994   O'Brien et al. .

*Primary Examiner*—Timothy F. Simone
*Attorney, Agent, or Firm*—Ostrolenk, Faber, Gerb & Soffen

[57] ABSTRACT

An electric griller includes a seat having a side wall defining a container and a grill frame releasably mounted to the seat. The grill frame has a substantially flat top surface on which a plurality of strips are formed to define therebetween oil-leading channels, each of the channels has a plurality of through holes. An electric heating device is mounted to the underside of the grill frame, having a socket adapted to receive and electrically connect to a plug of a power cord in connection with an external power supply. A plurality of vent holes are provided on the side wall of the seat.

3 Claims, 6 Drawing Sheets

ELECTRIC GRILLER

FIELD OF THE INVENTION

The present invention relates to an electric griller and in particular to a griller utilizing electric heating elements mounted on the underside of a grill frame. Only very limited electric power is required in the griller to generate high temperature for grilling foods. The griller is very reliable and convenient in use and cleaning after use.

BACKGROUND OF THE INVENTION

Conventional grillers are categorized into two types. One is to utilize charcoal to heat from the bottom of the grill and the food to be grilled is placed onto the top of the grill. The high temperature produced by the burning of the charcoal will grill the food. The second type is a meat grilling oven. Mini-size liquidized petroleum gas (LPG) is used to heat at the bottom of the metallic oven to rise the temperature of the top surface of the meat-grilling plate in order to cook the meat. However, these two types of grillers have some drawbacks as follows:

(1) It takes time and labor to burn the charcoal. Additionally, the burning of charcoal produces dense smoke and carbon monoxide, which endangers user's health.

(2) The burning of charcoal or LPG produces fire (flame) which may causes fire accident in case of ignorance.

(3) LPG itself is toxic. An incomplete combustion of LPG is dangerous to user's health. Besides, any leakage of LPG causes further hazard.

(4) The cleaning of the conventional grill frame is very laborious. This is because the dust after the burning of charcoal is difficult to dispose.

In order to solve the above drawbacks, Breville R & D Limited disclosed in U.S. Pat. No. 5,355,779 a griller using electric heating elements mounted to the back side of the grill frame to generate a high temperature on the grill frame for grilling food. However, the design disclosed in this US patent has some drawbacks as follows:

(1) It is an open griller, the air is in motion in between the bottom of the container and the griller. Thus the heat energy produced by the heating elements will be carried away by the movement of the air. Therefore, the power needed for heating has to be increased.

(2) A series of slits are provided in between the grill frame and the bottom of the container. The oil of the meat may be oozing out through the slits and this may hurt the user.

(3) No device is provided to secure the grill frame and thus, the grill is allowed to move, probably randomly, once the griller is moved and this may cause danger to the user when the grill frame is heated to a high temperature.

SUMMARY OF THE INVENTION

It is an object of the present invention to provide an electric griller which requires low electric energy consumption and is safety and easy to clean after use.

It is yet another object of the present invention to provide an electric griller, wherein the heat energy produced by the electric heating elements is uniformly transfer to every parts of the grill frame.

It is another object of the present invention to provide an electric griller, wherein the grill frame body is provided with an increase surface which prevents the heat from unexpectedly lost and thus the consumption of power is reduced.

Yet another object of the invention is to provide an electric griller, wherein the grill frame is mounted and secured on a seat so that moving of the griller does not cause the heated grill frame to move and thus is user safe.

It is another object of the invention to provide an electric griller, wherein the griller can be easily cleaned after use.

Further objects and advantages of the present invention will become apparent as the following description proceeds, with reference to the attached drawings, and the features of novelty which characterize the present invention will be pointed out with particularity in the claims annexed to and forming a part of this specification.

DETAILED DESCRIPTION OF THE PREFERRED EMBODIMENT

Figure 1:
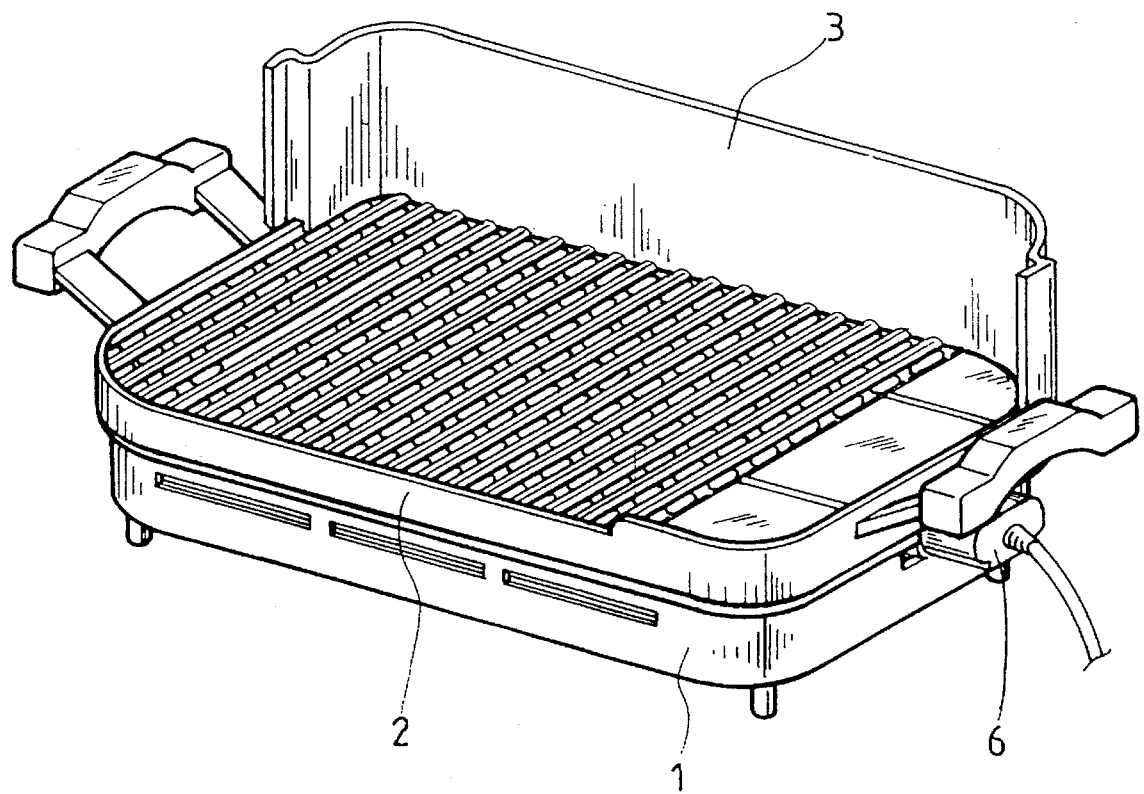
FIG. 1 is a perspective view showing an electric griller constructed in accordance with the present invention.
Figure 2:
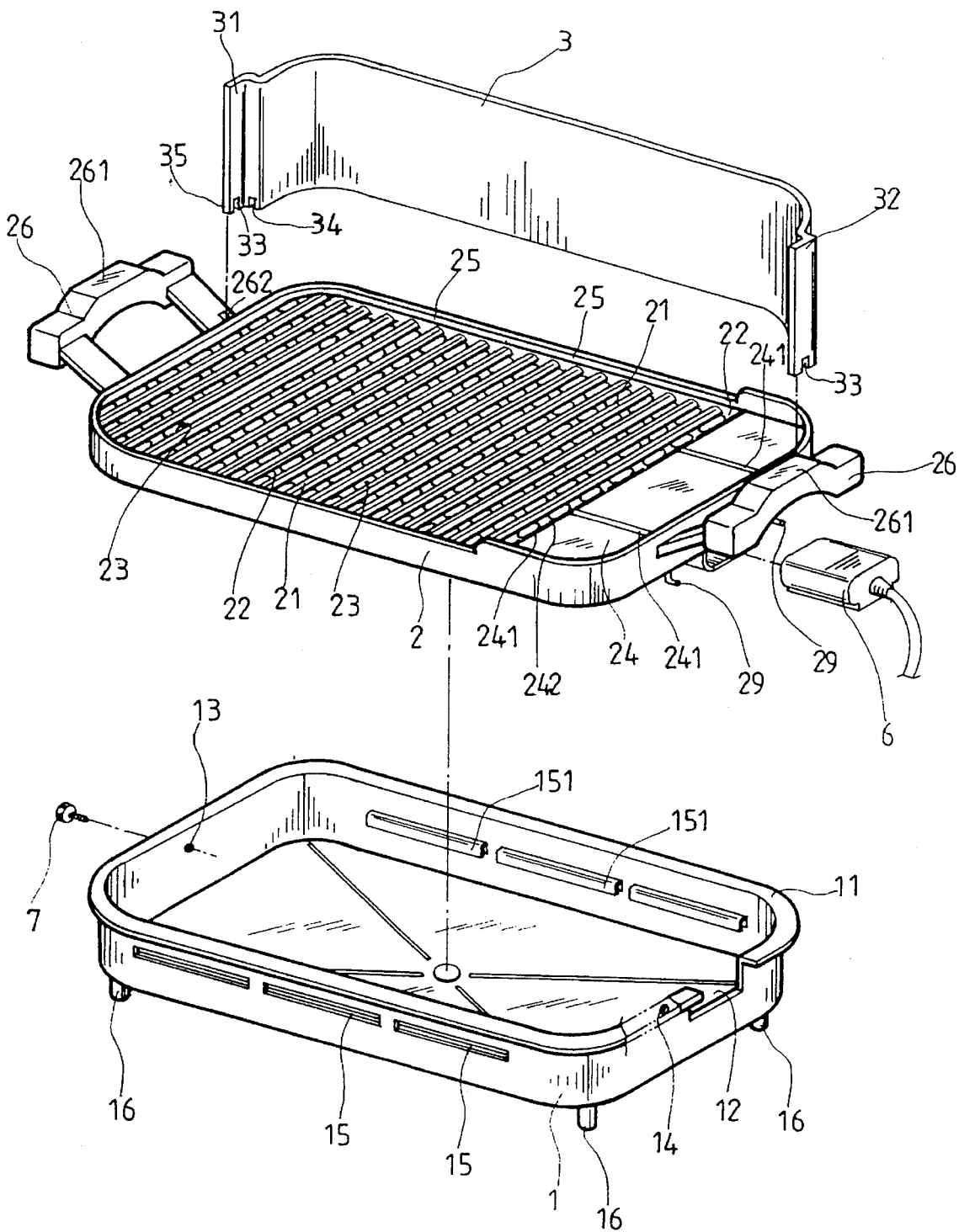
FIG. 2 is an exploded perspective view of the electric griller in accordance with the present invention.

Referring to FIGS. 1 and 2, wherein an electric griller constructed in accordance with the present invention is shown, the electric griller comprises a seat 1 which defines a container surrounded by a circumferential side wall and a grill frame 2 to disposed on the seat 1. A blocking board 3 is optionally provided on the grill frame 2 so as to avoid the bursting out of oil from meat during the grilling process. The grill frame 2 is closely mounted to the top portion of the seat 1. A power cord 6 having plug to be releasably connected to and forming electrical connection with an electric heating element 4 (FIG. 3) mounted to the underside of the grill frame 2 to connect the heating element 4 to an external power supply in order to allow the grill frame 2 to be heated by the heating element 4 and thus having a high temperature for grilling food and meats.

The grill frame 2 is basically a flat member having formed on a top surface thereof a plurality of metallic strips 21 forming a corrugated configuration. The strips are arranged equally spaced on the grill frame surface and substantially parallel with each other to define between any two successive ones of the strip 21 an oil-leading channel 22 for the collection of oil during the grilling process. Each of the oil-leading channel 22 is provided with a plurality of holes 23 are for draining the oil collected therein and to allow the oil produced during the grilling process and so collected to drip into the container defined by the seat 1.

At one lateral side of the top surface of the grill frame 2, a flat area 24 is provided, having two protruded strips 241 formed thereon to divide the flat area 24 into three sections. These sections are used, for example, for the frying of eggs. The protruded strips 241 also allow a user to place cooked food thereon and away from the flat area 24 and the oil of the cooked food will drip to the flat area 24 and flow to the adjacent oil-leading channel 22 via notches 242.

At a longitudinal side of the grill frame 2, a gap 25 is provided between the edge flange of the grill frame 2 and the metallic strips 21 so that the metallic strips 21 do not directly connect to the edge flange of the grill frame 2. The blocking board 3 is received within the gap 25 so as to be retained against an inner side of the edge flange of the grill frame 2 so that when oil oozes from the meat, the blocking board 3 will block the sputtering of the oil and the oil will be collected at the inner side of the edge flange of the grill frame 2 and the gap 25.

The lateral sides of the grill frame 2 are each provided with a heat-resistance grip 26 to enable the griller to be lifted, the grip 26 having an arch shape. Preferably, a flat surface 261 is provided on the arch-shaped grip 26 to allow the grill frame 2 to be placed up side down.

Figure 3:
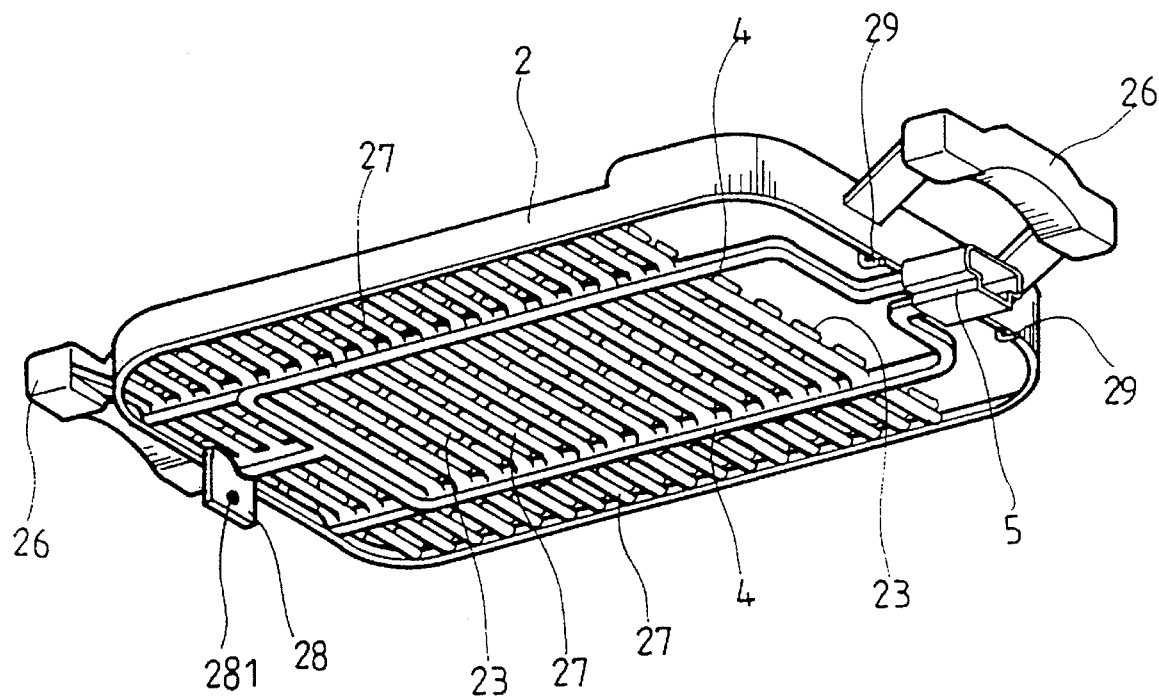
FIG. 3 is a perspective view showing the grill frame in accordance with the present invention observed from the underside thereof.

Referring to FIG. 3, the electric heating element 4, that is arranged on the underside of the grill frame 2, has formed on one end thereof a socket 5 to receive therein the plug of the electric cord 6 for establish electrical connection therebetween. The heating element 4, once supplied with electricity from the electric cord 6, generates high temperature to heat the grill frame 2 and thus the food or meats placed on the grill frame 2. On the underside of the grill frame 2, a plurality of ribs 27 are distributed around the heating element 4, serving to uniformly distribute the heat generated by the heating element 4 to the whole surface of the grill frame 2 in order to provide a uniform heating of food.

The grill frame 2 also has a depending tab or protruded block 28 formed on one lateral side thereof, with a screw hole 281 formed thereon. The grill frame 2 also has formed on an opposite lateral side with two hooks 29 to be received within retaining holes 14 formed on seat 1 for mounting the grill frame 2 to the seat 1.

The seat 1 is configured as a container or a through defined by a circumferential side wall, which container is for collecting oil generated during the grilling process. The seat 1 is provided on a top edge thereof with a circumferential flange 11, which is to support the underside of the grill frame 1. An opening 12 is provided on the side wall of the seat 1 for the access to the socket 5 of the heating element 4 when the grill frame 2 is mounted to the seat 1 in order to connect to the plug of the electric cord 6.

The side wall of the seat 1 is provided at a location corresponding to the screw hole 281 of the depending tab 28 with a screw hole 13 through which a screw 7 runs to extend through the screw hole 281 of the depending tab 28 to secure the grill frame 2 on the seat 1. The side wall of the seat 1 is also provided with two retaining holes 14, corresponding in positions to the hooks 29 of the grill frame 1 to receive the hooks 29 therein and thus retain the grill frame 2 on the seat 2.

Figure 4:
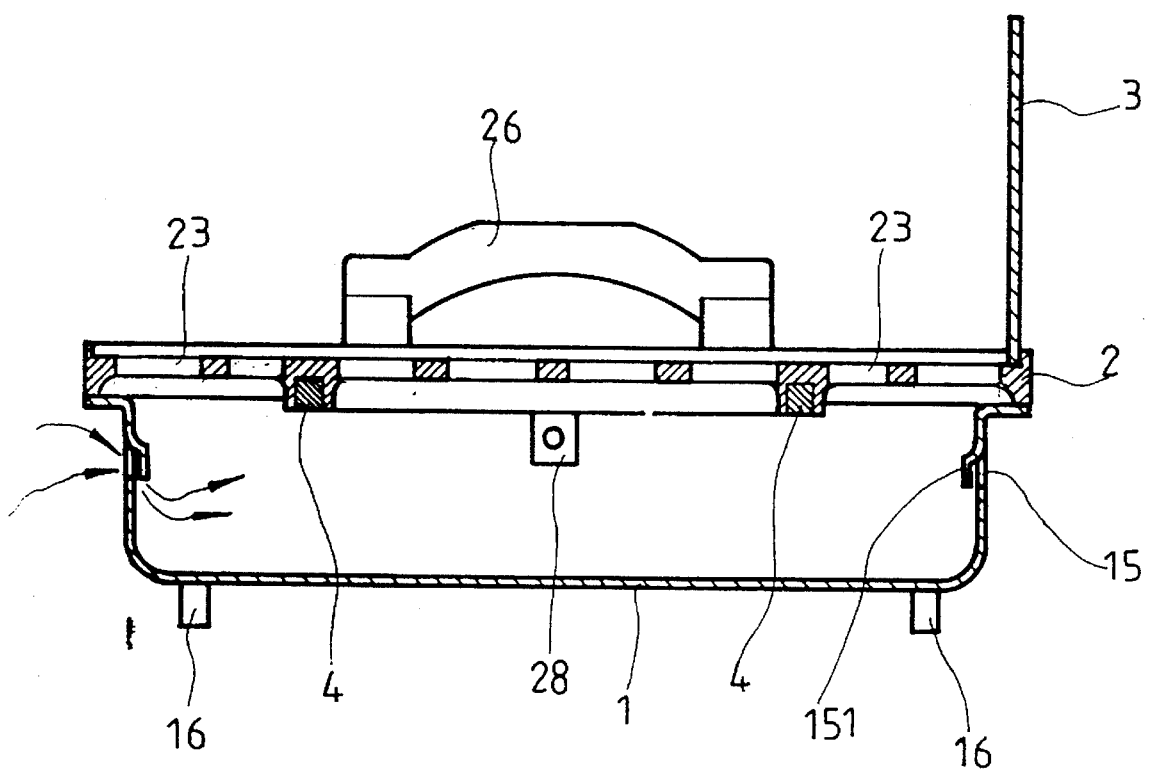
FIG. 4 is a cross-sectional view of the electric griller shown in FIG. 1.

Also, a plurality of vent holes 15, which allows air to flow in and out of the seat 1, are provided on the side wall of the seat 1, each having a shielding board 151 (as shown in FIG. 4) located on an inside surface of the side wall and above the vent hole 15 and extending inward therefrom to prevent the oil from flowing into the vent hole 15. The shielding boards 151 are so configured and arranged so that the movement of air flow into/out of the vent holes 15 are not affected by the shielding boards 151. The air flow thought the vent holes 15 serves to lower down the temperature of the griller when the griller has a too high temperature to be dangerous to the parts of the griller by expelling part of the heated air via the holes 23 of the grill frame 1 and drawing in low temperature air via the vent hole 15 so as to keep the temperature at an appropriate level.

The seat 1 is provided on the bottom side thereof a plurality of feet 16 to uplift and support the seat 1. This helps controlling the temperature in contact with the table on which the griller is placed.

The blocking board 3 is an elongated arch-shaped board which is made to adapt to the inner edge of the grill frame 2. The blocking board 3 is designed so that two opposite lateral sides thereof are formed with circular arch end sections 31 and 32, each having engaging slots 33 and 34. The engaging hole 34 has a width substantially corresponding to thickness of the edge flange of grill frame 1 to be fit and tightly held thereon. The grips 26 of the grill frame 2 are each provided with an insertion hole 262 to receive therein an insertion end portion 35 of each of the end sections 31 and 32 with the provision of the hole 33 which straddles over a side edge of the insertion hole 262 to further secure the blocking board 3 on the grill frame 2.

Figure 5:
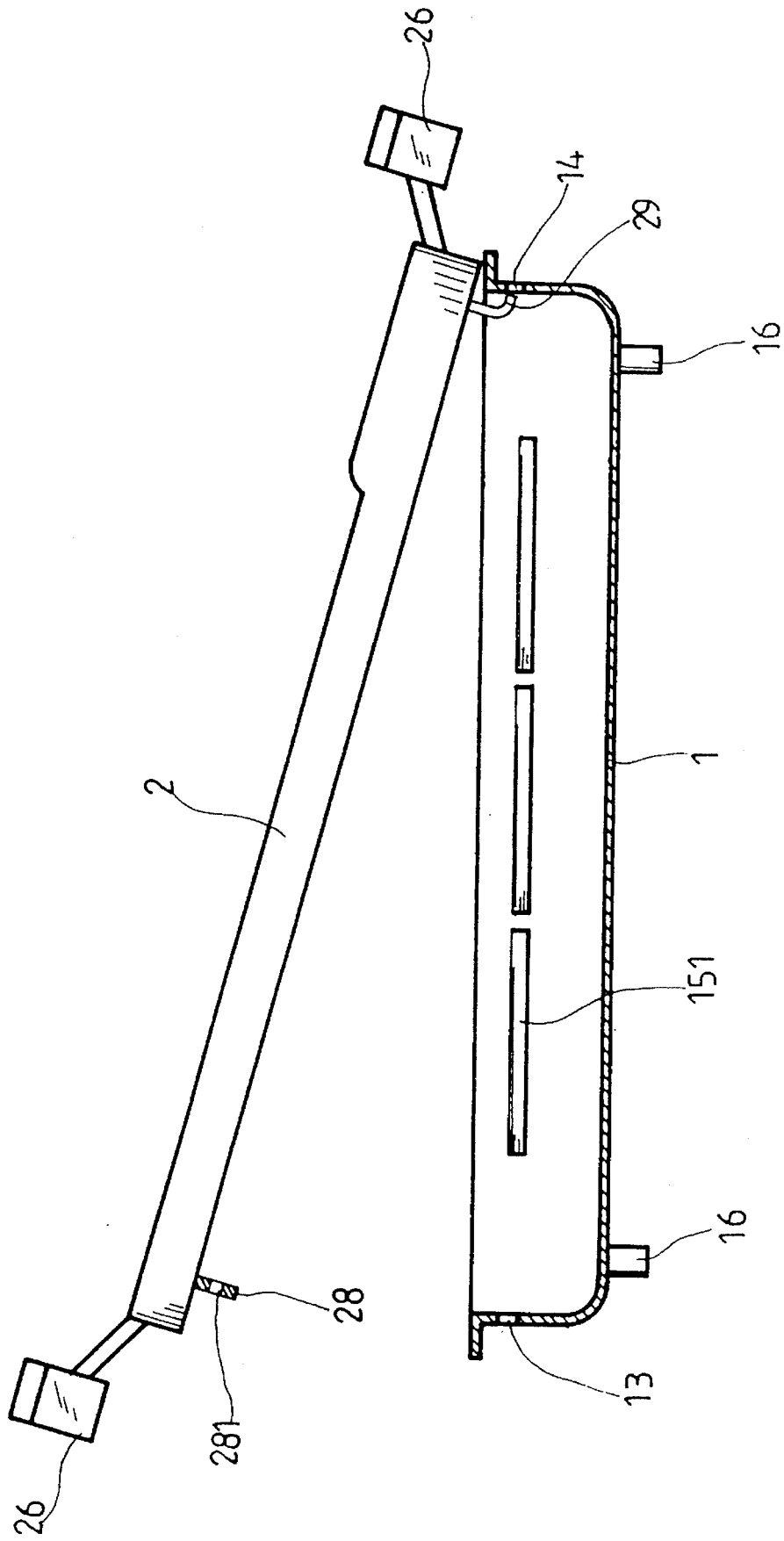
FIG. 5 is side elevation of the electric griller in accordance with the present invention, showing the mounting of the grill frame to the seat.
Figure 6:
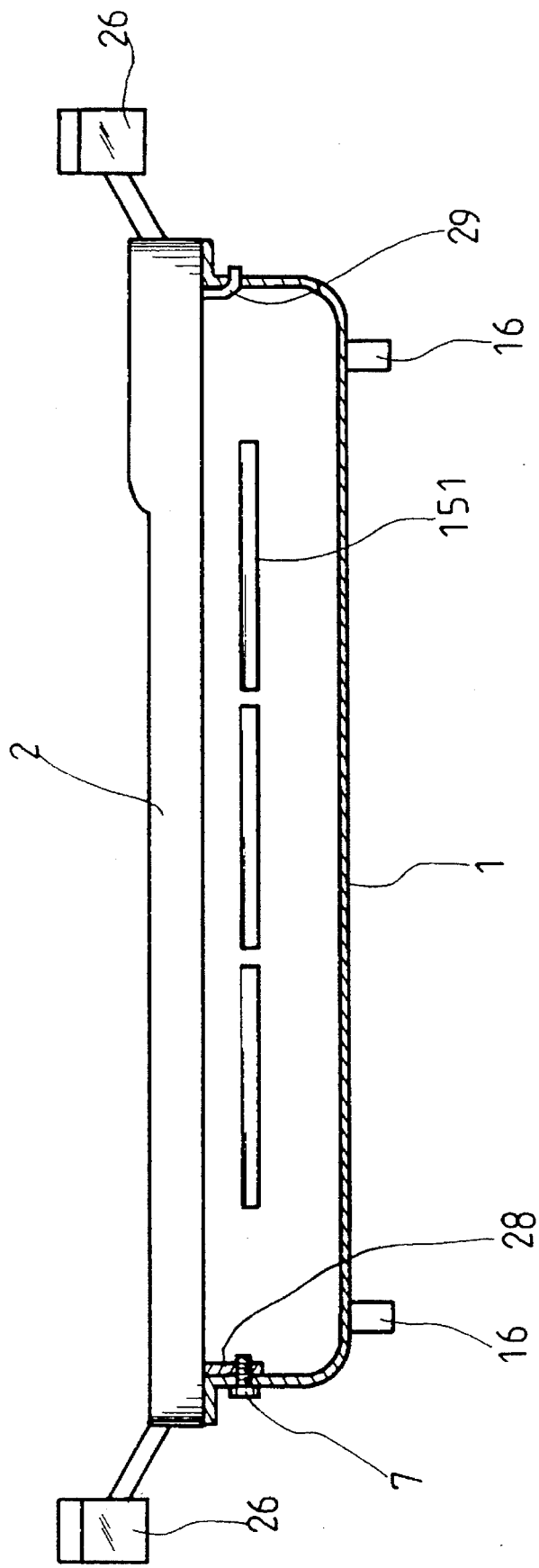
FIG. 6 is a side elevation view of the electric griller of the present invention, showing the grill frame completely seated on the seat.

Referring new to FIGS. 5 and 6, there are shown the mounting of the grill frame 2 to the seat 1 in accordance with the present invention. The hooks 29 provided on the underside of the grill frame 2 are first inserted into the retaining holes 14 of the seat 1, as shown in FIG. 5, to serve as pivot means and allowing the grill frame 2 to be rotated to be completely seated on the seat 1, as shown in FIG. 6. The screw 7 then extends through the screw holes 13 and 281 to secure the grill frame 2 on the seat 1.

The nature of the present invention having been sufficiently described, it is possible to introduce changes of form, material, and arrangement to the invention as a whole and its component parts without departing from the framework of the present invention, in as much as alterations do not invalidate its basic.

What is claimed is:

1. An electric griller comprising a seat having a side wall defining a container and a grill frame releasably mounted to the seat, the grill frame having a substantially flat top surface on which a plurality of strips are formed to define therebetween oil-leading channels, each having a plurality of through holes, electric heating means mounted to underside of the grill frame, having a socket adapted to receive and electrically connect to a plug of a power cord in connection with an external power supply, a plurality of vent holes being provided on the side wall of the seat.

2. The electric griller as set forth in claim 1, wherein a blocking board is provided on the grill frame and retained at one side thereof against an inner edge of the grill frame.

3. The electric griller as set forth in claim 1, wherein the grill frame has a flat region formed on the top surface thereof.

\* \* \* \* \*